S. H. PHELPS.
TRACTOR HITCH.
APPLICATION FILED SEPT. 6, 1919.

1,358,392.

Patented Nov. 9, 1920.
4 SHEETS—SHEET 1.

INVENTOR
SPENCER H. PHELPS
BY Paul Paul
HIS ATTORNEYS.

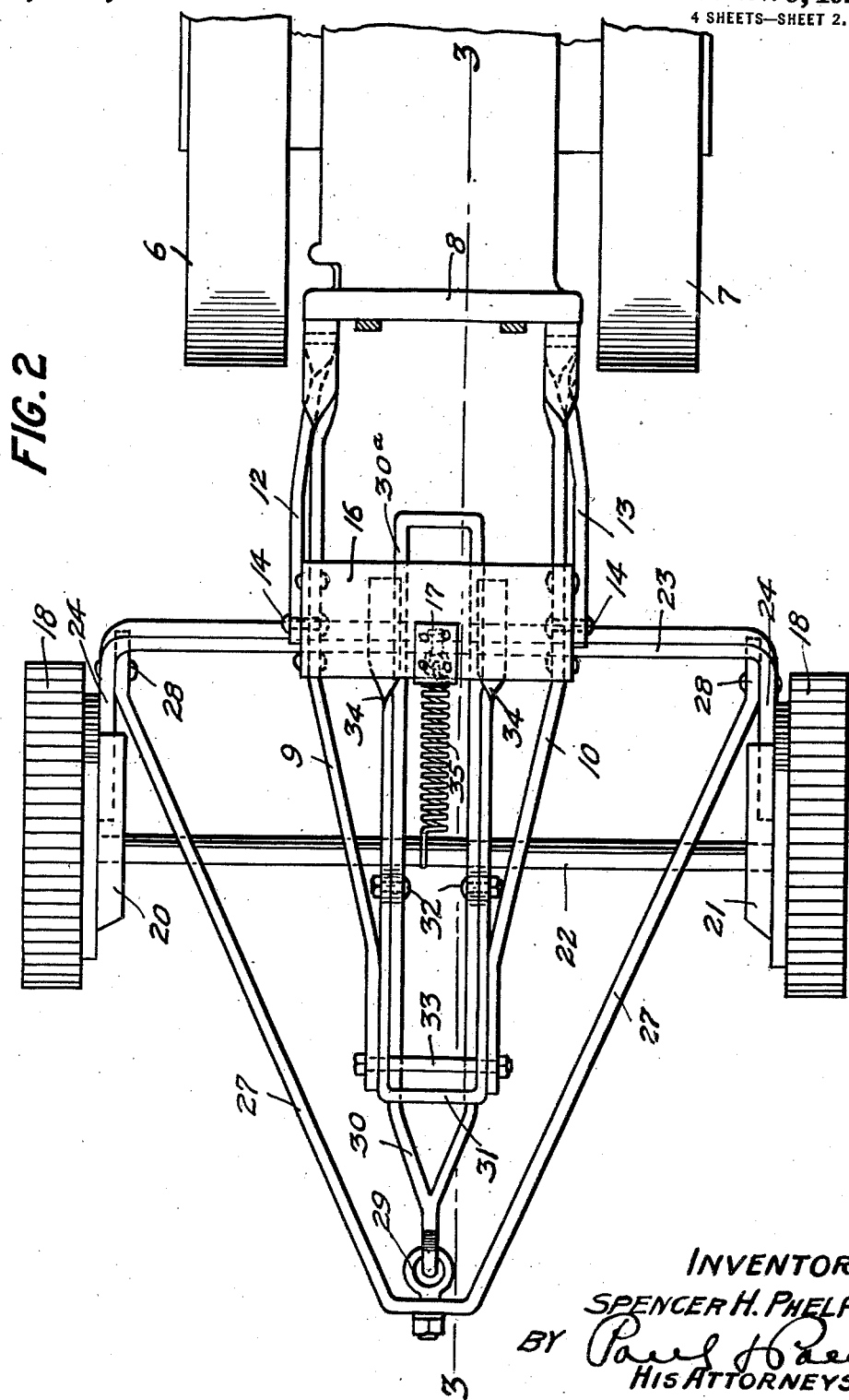

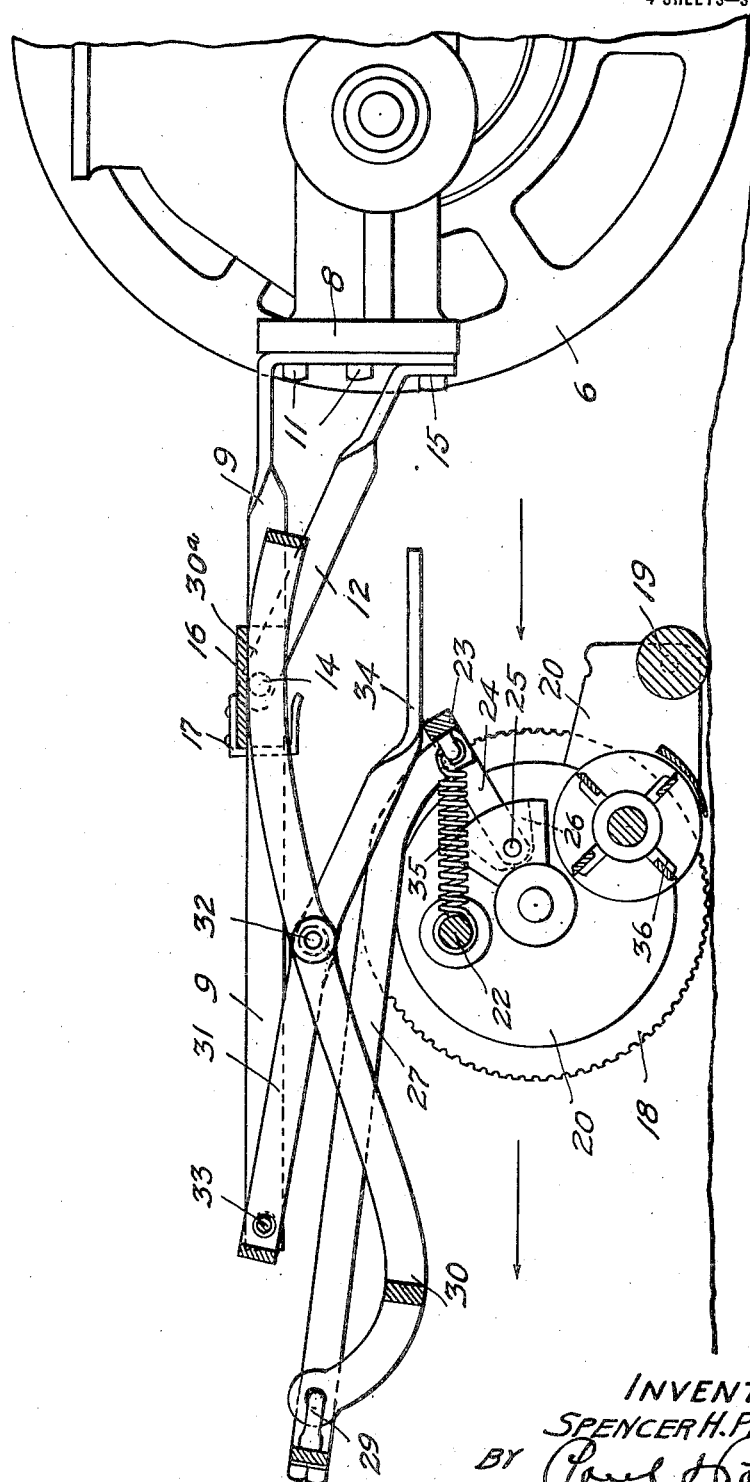

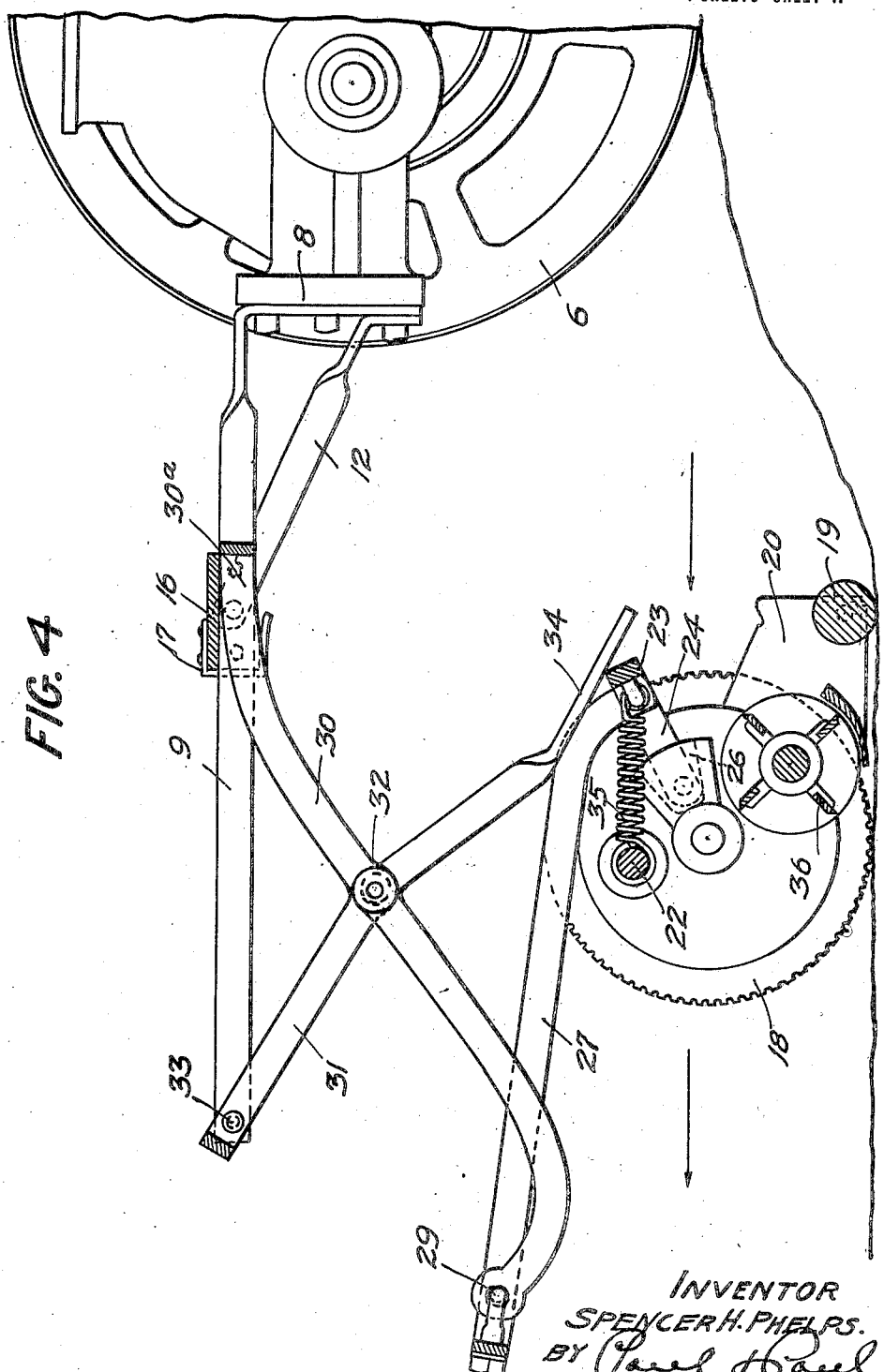

UNITED STATES PATENT OFFICE.

SPENCER H. PHELPS, OF MINNEAPOLIS, MINNESOTA, ASSIGNOR TO BEEMAN TRACTOR COMPANY, OF MINNEAPOLIS, MINNESOTA, A CORPORATION OF MINNESOTA.

TRACTOR-HITCH.

1,358,392.   Specification of Letters Patent.   Patented Nov. 9, 1920.

Application filed September 6, 1919. Serial No. 322,099.

*To all whom it may concern:*

Be it known that I, SPENCER H. PHELPS, a citizen of the United States, resident of Minneapolis, county of Hennepin, State of Minnesota, have invented certain new and useful Improvements in Tractor-Hitches, of which the following is a specification.

The invention relates to hitches for attaching implements or tools to tractors and the objects of the invention are first:

To provide a hitching device that will constantly equalize the hitching point of the tractor at a predetermined distance above the ground relative to the implement when the tractor is traveling over hilly, uneven or bumpy ground.

Second, to provide a hitch which, when extended far enough ahead to attach an implement in front of the tractor, will completely neutralize the effect of the relatively varying levels of the tractor wheels and implement on such ground and render the operation of the implement constantly efficient, irrespective of the surface condition.

Third, to provide a hitch that will equalize the vertical line of draft in the manner described both when moving straight ahead and when turning the tractor around.

Fourth, to provide a hitch that may be attached to any tractor and that is simple of construction and cheap of manufacture. Other objects will appear from the following detailed description and while the hitch may be applied in different positions to tractors and various implements, it is particularly valuable when, in order to avoid side draft in mowing machines and similar implements, the machines are required to be attached to the front end of the tractor. The necessity for front end attachment is especially present where a tractor is used for operating one or more lawn mowing machines in order to enable the operator to move the machine close to fences, trees and around obstacles. It is also very essential to the efficient operation of this class of machines that the tractor wheels do not pass over the uncut ground in advance of the implement as the wheels would press the grass down and prevent the mower from making a clean, uniform cut. Heretofore it has been found wholly impracticable to extend the hitch far enough in front of the tractor to attach certain implements for the reason that the relative rising and falling movements of the tractor wheels and implements on uneven ground, were multiplied in degree at the forward hitching point, making the proper operation of the implement impossible. This multiplying effect of the vertical vibrations common to all hitches placed in front or in the rear of the tractor wheels is not only neutralized but practically the entire vibrations of the hitching point relative to the implement are prevented and means provided for guiding the implement in the proper plane for efficient operation.

In the drawings, I have illustrated the hitch attached to the front end of a small garden tractor, propelling a conventional lawn mowing machine, and it will be understood that any number of machines may also be attached to the rear end of the tractor, if desired.

The invention consists of certain constructions and combinations as hereinafter described and particularly pointed out in the claims. In the accompanying drawings, Figure 1 is a side elevation of a small garden tractor and lawn mower having my hitch applied thereto and in a position on level ground.

Fig. 2 is an enlarged plan view of the hitch, the front part of the tractor and lawn mower frame.

Fig. 3 is a vertical sectional view on the line 3—3 of Fig. 2 illustrating the position and form assumed by the hitch when the lawn mower is on a higher level than the tractor wheels.

Fig. 4 is a similar view showing the relative position of the parts when the tractor wheels are at a considerable higher point than the lawn mower.

Figure 1:
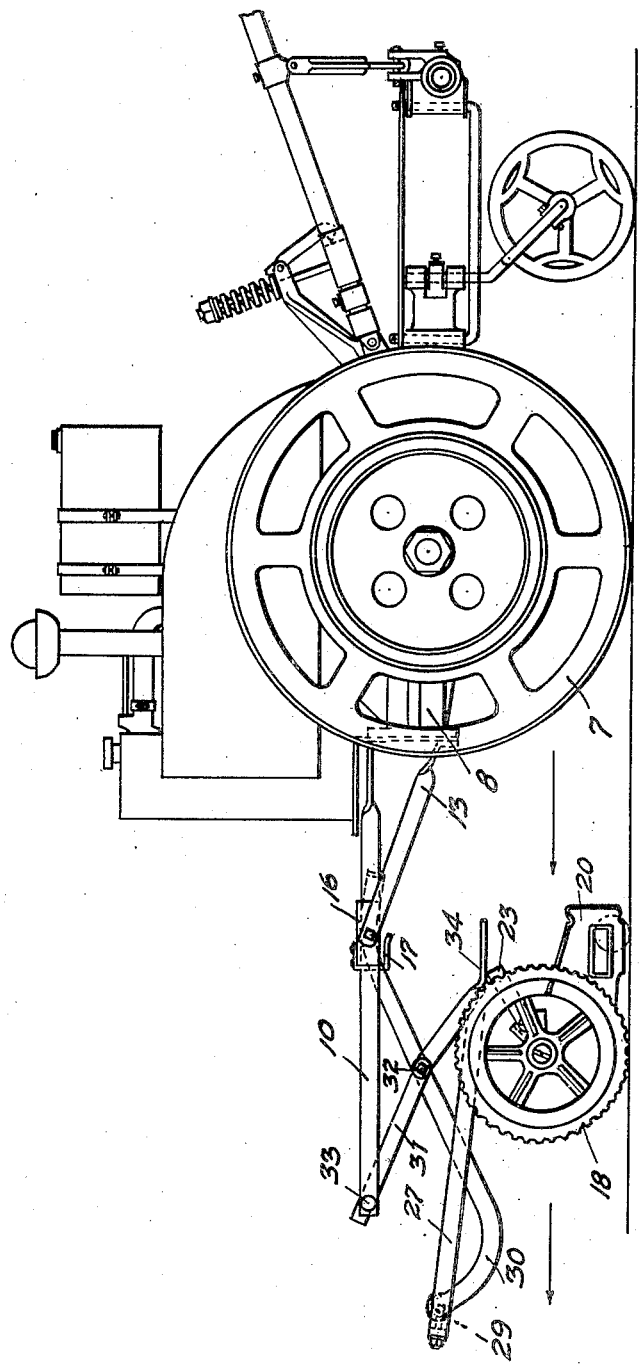

In the drawings 6 and 7 are the traction wheels, 8 the tractor frame and 9 and 10 forwardly extending brackets, rigidly secured to the frame 8 by bolts or screws 11. Braces 12 and 13 are preferably riveted at 14 to the brackets 9 and 10 and to the frame 8 and 15. A cross connecting bar or plate 16 is securely riveted to the brackets 9 and 10 and is preferably provided with a hooked angle piece 17. The lawn mower is of any preferred conventional type and is supported on wheels 18 and roller 19. The frames 20 and 21 of the machine are connected by a rod 22 and are provided with the yoke bar 23 having the ordinary yoke arms 24 pivoted at 25 in V-shaped sockets 26 in which the arms have a limited movement as indicated in dotted lines in Figs. 3 and 4. Instead of the handle bar usually attached to the yoke 23 and extending rearwardly to the operator, a V-shaped draw-bar 27 is rigidly attached to the yoke arms 24 at 28 and move with the arms on their pivot at 25. The draw bar 27 is provided with an eye bolt 29, to which is linked a curved double membered arm 30. This arm extends backward and its rear curved end 30$^a$ bears slidingly against the under side of the plate 16 and is pivotally connected about centrally with a U-shaped link 31 by studs or bolts 32. The link 31 is pivotally connected at its forward end to the brackets 9 and 10 by a bolt or pin 33. At the inner and opposite end it is provided with extension feet 34, resting at a certain angle and free to slide on the mower yoke 23. The pivot point 32 of the U link 31 and arm 30 is nearly midway between the forward pivot point 33 and the supporting point for the feet 34 on the yoke bar 23. A coil tension spring 35 is attached to the yoke bar 23 and to the frame rod 22 of the mower and tends to pull the draw bar 27 forward. This action has the effect of forcing the link feet 34 downward against the yoke bar 23 through the medium of the arm 30 and pivots 32, the upper pivot 33 being the stationary point. It also forces the inner end 30$^a$ of the arm 30 upward against the plate 16 and normally holds the yoke arms 24 centrally in the sockets 26 when the mowing machine is on level ground. By reason of the V-shaped sockets 26 the lawn mower is free to rock on its axis to the extent necessary to automatically adjust the cutters 36 to the level of the ground, but it is held in operative position on the ground by the downward pressure of the link feet 34 on the yoke 23.

In operation as the tractor advances, the propelling force is primarily exerted against the forward hitch point 33 of the brackets 9 and 10. The force is transferred by the link 31 to the central portion of the arm 30 and by the arm 30 to the draw bar 27 connected to the implement.

The resistance moment of the implement, in this case the lawn mower, forces the inner curved end 30$^a$ upward against the stationary plate 16, which plate, by preventing upward movement of the arm 30, keeps the hitch in equilibrium and transfers the propelling force to the implement. The link feet 34, pressing on the yoke bar 23 prevent the lawn mower from tilting upward and at the same time the forward pull on the draw bar 27 through the link 31 acting centrally on the arm 30 between the linkage point 33 and bearing point 30$^a$ prevents upward tilting of the draw bar 27 and the pressure of the link feet 34 against the yoke bar 23 prevents downward tilting of the draw bar 27 and keeps it in a level position.

When the tractor wheels drop below the lawn mower as in Fig. 3 the primary hitch point 33 and bracket plate 16 drop toward the ground, the bracket in a less degree, but the draw bar hitch point 29 is held at the same level by the neutralizing effect of the lowered plate 16 upon the arm 30 through the pivot 32 and link 31. The linkage of the hitch in effect closes up while the draw bar link point remains the same.

In this position the arc prescribed by the link 31 forces the arm 30 to slide backward under the plate 16 and the feet 34 to slide backward on the yoke bar and this action again equalizes the upward and downward pressures against the draw bar and keeps it in the same level position. When the lawn mower drops below the tractor wheels as in Fig. 4, the primary hitching point 33 raises, the hitch automatically opens up and the arm 30 and link feet 34 slide ahead on their respective bearings, but the horizontal force and the opposing vertical forces acting on the draw bar 27 remains relatively the same and the bar will be maintained in the same horizontal position.

The angle plate 17 serves to prevent the arm 30 sliding from underneath the plate 16 in case of an excessive drop of the implement.

The hitch arms and links are of sufficient rigidity to swing the draw bar around in any position of the hitch as the primary hitching point 33 is swung around when a turn of the tractor is made. The universal action of the eye bolt 29 permits the horizontal turning of the implement as well as vertical adjustment of the hitch and as the lawn mower is swung around the feet 34 are free to slide correspondingly on top of the yoke bar 23, while the equalizing pressure of the feet against the yoke and draw bar remains the same.

It is obvious that various modifications might be made in the detail construction of the hitch without departing from the principle and scope of the invention and I do not therefore wish to limit myself to the exact construction shown and described.

I claim as my invention:

1. The combination of an implement, a frame having a supporting means and an implement hitch connecting said frame with said implement, said hitch including members mounted to open and close to allow the implement to follow the inequalities of the surface over which it is moving.

2. The combination, with a frame having a supporting means, and an implement resting upon the ground in advance thereof, of an implement hitch mounted to project in front of said frame, said hitch including members having pivotal connections with each other and with said frame and implement to allow said implement to follow the ground line.

3. The combination, with a wheeled frame, and an implement, of implement hitch members pivotally mounted one upon the other and having pivotal connections with said frame and with the implement, and said members also having movable bearings on said frame and implement.

4. The combination, with a wheeled frame, and an implement in advance thereof, and a bracket projecting in front of said frame, of implement hitch members pivoted one upon the other interposed between said implement and bracket, one end of said hitch members having pivotal connections respectively with said bracket and said implement and the other ends of said members having freedom of movement on said bracket and implement.

5. The combination, with a wheeled frame and a bracket projecting in front of the same, of a hitch composed of link members pivoted one upon the other, an implement whereto one of said link members is pivotally connected, the other link member having a pivotal connection with said bracket and said members having sliding bearings respectively on said bracket and implement.

6. The combination, with a frame having supporting means and a draft bracket and an implement disposed beneath said bracket, of hitch members connecting said implement and bracket and mounted to open and close to allow said implement to accommodate itself to inequalities of the ground over which it is moving.

7. The combination, with a frame having supporting means and a draft member and a mowing machine beneath said draft member, of a draft hitch connecting said mowing machine with said draft member and composed of links mounted for relative movement to allow said mower to adjust itself to inequalities of the ground.

8. The combination, with a wheeled frame and a draft member projecting in advance of the same and a mowing machine disposed beneath said draft member. of hitch members connecting said mowing machine with said draft member and composed of links pivoted one upon the other and having their forward ends pivotally connected respectively with said draft member and with said mowing machine, and their rear ends mounted to slide respectively on said draft member and said mowing machine.

9. The combination, with a wheeled frame and a draft member projecting in front of the same, of a mowing machine having a yoke and a draft bail connected with said yoke and projecting forwardly therefrom, of hitch members having pivotal connections respectively with said draft member and said yoke mounted one upon the other for relative movement, said hitch members having movable bearings respectively on said draft member and said yoke.

10. A tractor hitch comprisng a tractor member and a draw bar, said tractor member and said draw bar having hitching points, variable as to vertical distance between them, extensible and contractible link arms connecting said hitching points and means for automatically extending or contracting said link arms correspondingly with the varying distances between said hitching points.

11. A tractor hitch comprising a tractor member having a primary hitch, a draw bar having variable hitch, draft mechanism connecting said hitches, said mechanism including link arms automatically opening and closing correspondingly with the variable distances between the hitches.

12. A tractor hitch comprising a tractor member and a draw bar having variable distance hitching points, drawing extensible link arms connecting said hitching points and means for automatically opening and closing said link arms correspondingly with the varying distances between said hitching points.

13. A tractor hitch comprising a tractor member having a primary hitching point, a draw bar having a hitch vertically movable with respect to the primary hitching point, means for attaching an implement to said draw bar, link arms connecting the tractor member and the draw bar and means coacting with said link arms for automatically compensating for varying levels of said tractor member and said implement to keep the draw bar hitch at a constant level with the implement.

14. A tractor hitch comprising a tractor member having an upper forward hitching point, a draw bar having a hitching point normally below and in front of said forward hitching point, means for attaching an implement to said draw bar, link arms connecting both of said hitching points, and means coöperating with said link arms for automatically compensating for the varying vertical distance between said hitching points and keeping the lower hitching point at a constant level with respect to said implement.

15. A tractor hitch comprising a draw bar, a tractor member having a forward hitching point, a link connected to said member at said point, an arm pivotally connected to said link back of said forward hitching point, and having rearward connection with the tractor member and forward connections with said draw bar, and means for connecting an implement to said draw bar.

16. The combination of an implement, a frame having a supporting means and an implement hitch connecting said frame with said implement, said hitch including members pivoted one upon the other for freedom of relative movement to allow the implement to follow the inequalities of the surface over which it is moving.

17. The combination of an implement, a frame having a supporting means and a draft member mounted on said frame and overhanging said implement, and an implement hitch connecting said frame with said implement and composed of members mounted for relative movement one upon the other to allow the implement to follow the inequalities of the surface over which it is moving.

18. The combination of an implement, a frame having a supporting means and a draft member mounted on said frame and overhanging said implement, and an implement hitch connecting said frame with said implement and composed of members mounted for relative movement to allow the implement to follow the inequalities of the surface over which it is moving.

In witness whereof, I have hereunto set my hand this 28th day of August, 1919.

SPENCER H. PHELPS.